United States Patent [19]
Shearer et al.

[11] 3,866,051

[45] Feb. 11, 1975

[54] DIGITAL INTERFACE MODULE

[75] Inventors: Gerald W. Shearer, Orange; Edward A. Wakida, Gardena, both of Calif.

[73] Assignee: Xerox Corporation, Stamford, Conn.

[22] Filed: Feb. 1, 1973

[21] Appl. No.: 328,587

[52] U.S. Cl. .................. 250/551, 250/208, 307/315

[51] Int. Cl. .......................................... H01j 39/12

[58] Field of Search ........... 250/217 S, 217 SS, 208, 250/209, 220 R, 211 J, 551, 568, 552; 307/311, 315

[56] References Cited

UNITED STATES PATENTS

| | | | |
|---|---|---|---|
| 3,188,474 | 6/1965 | Ress | 250/209 |
| 3,215,845 | 11/1965 | Solomon et al. | 250/209 |
| 3,238,372 | 3/1966 | Te Velde | 250/209 |
| 3,375,373 | 3/1968 | Hageman | 250/209 |
| 3,401,266 | 9/1968 | Cooke-Yarborough | 250/217 J |
| 3,549,890 | 12/1970 | Keller | 250/220 R |
| 3,553,465 | 1/1971 | Martin | 250/209 X |
| 3,693,027 | 9/1972 | Garaway | 307/311 X |
| 3,708,672 | 1/1973 | Marinkovic | 250/214 R |
| 3,777,188 | 12/1973 | Mazur | 307/311 |

*Primary Examiner*—Walter Stolwein

[57] ABSTRACT

An interface module making use of photo-optical coupling techniques both in the logical control circuitry and in the load waveform responsive circuitry to optimize the degree of isolation between digital circuits and an industrial environment with its associated high voltage and noise.

22 Claims, 2 Drawing Figures

DIGITAL INTERFACE MODULE

BACKGROUND OF THE INVENTION

The instant invention relates to electrical isolation devices, and more particularly to devices for isolating electrical noise and voltage of an industrial environment from a digital data processing device.

Electronic digital computers are finding increased use in industrial environments, for example as output/-recording devices for measurements of process parameters and as controllers for industrial processes.

In both instances, a device is utilized to monitor or control a parameter or process, which device must be linked to the digital computer or controller.

One of the primary problems related to the use of digital devices in this manner is the existence of noise and high voltage often associated with industrial control.

Traditionally, noise and high-voltage isolation has been accomplished by mechanical relays and pulse transformers. Later developments utilized photo isolation techniques to some extent, but usually relied at least partially upon mechanical or magnetic coupling.

SUMMARY OF THE INVENTION

In accordance with the instant invention, an interface device is described which relies fully on optical coupling or photo-coupling to provide complete isolating between a digital device and an AC switch.

Accordingly, it is an object of the instant invention to provide an interface device for isolating industrial high voltage from a digital system.

It is a further object of the invention to provide a coupling device of small size.

It is a still further object of the instant invention to provide a digital computer controlled AC switch which prevents noise and voltage spikes produced by the controlled device from reaching the digital circuits.

These and other objects and advantages of the invention will be apparent from the description of the invention when read in conjunction with the accompanying drawings.

DESCRIPTION OF THE PREFERRED EMBODIMENT

Figure 1:
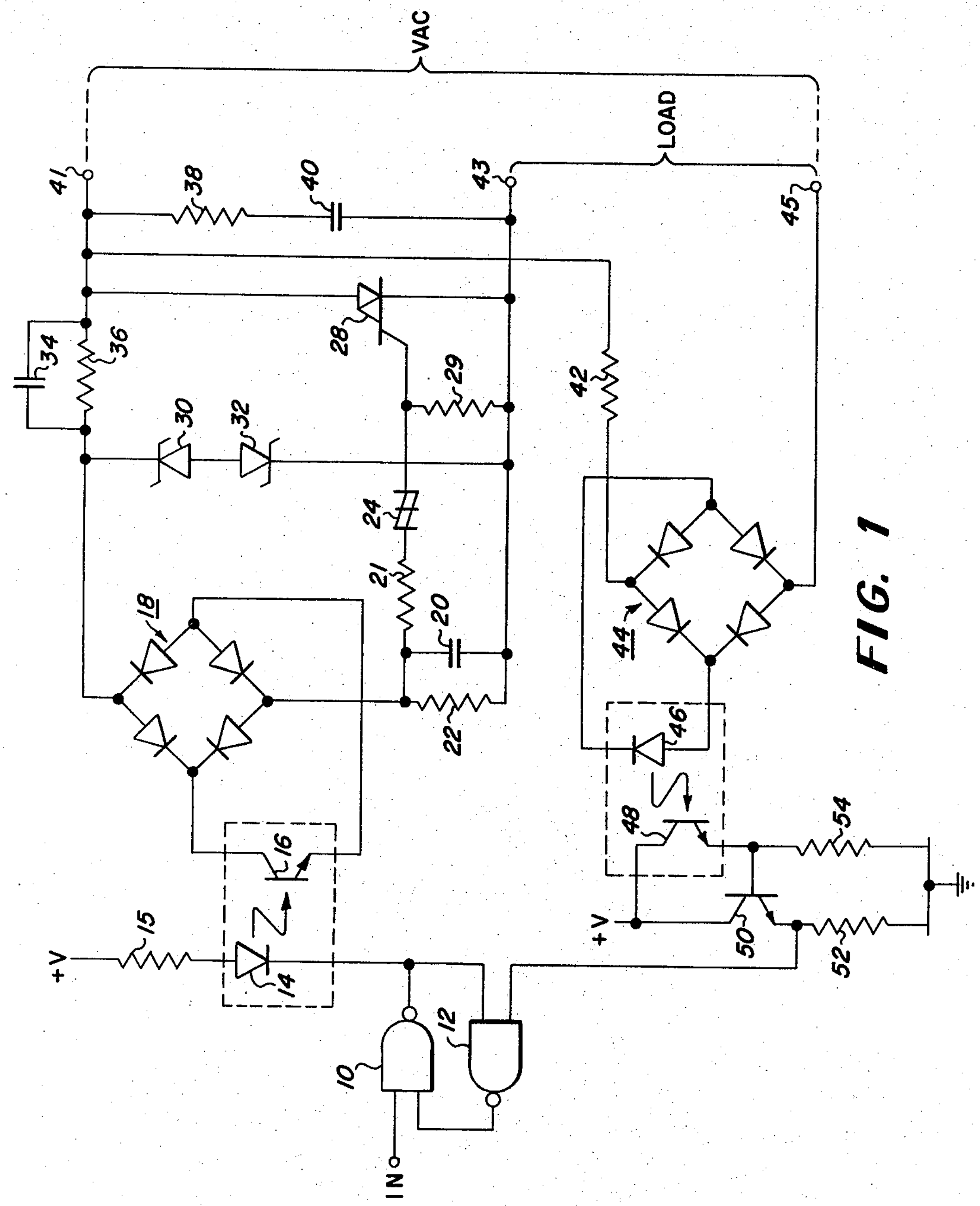
FIG. 1 is a schematic diagram of an improved coupling circuit for an AC switch.

The device of the instant invention is shown in schematic form in FIG. 1. Generally, a logic signal is applied from a device which is used to control the operation of the switch connecting an AC source to a load. The input logic consists of a pair of NAND gates 10 and 12. The output terminal of gate 10 is connected to the cathode of a light emitting diode 14, the anode of which is connected through a resistor 15 to a positive voltage source.

Light emitting diode 14 is optically coupled to a light sensitive transistor 16, the emitter and collector of which are connected to input terminals of a four-diode full wave rectifier 18.

One of the outp[illegible]t terminals of the rectifier 18 is connected to one [illegible] a capacitor 20 and its associated charging resis[illegible] [illegible]22. The other sides of the capacitor 20 and resisto[illegible] are connected to a common terminal 43. Capacitor 20 is further connected through a limiting resistor 21 to a bi-directional switch 24 which in turn is connected to the gate terminal 26 of a Triac device 28.

The remaining output terminal of the rectifier 18 is connected through an RC network consisting of a capacitor 34 and a resistor 36 to the anode of the Triac 28. The cathode of the Triac is connected to the common terminal 43. A biasing resistor 29 connects the gate 26 of the Triac device 28 to the same common terminal.

In parallel with the Triac 28 are a pair of back-to-back Zener diodes 30 and 32. Further, also in parallel with the Triac device is a filter circuit consisting of resistor 38 and capacitor 40, the function of which is to decrease dv/dt voltage spikes across the Triac which would tend to turn the device on under inductive loads.

The anode of the Triac device is further connected through a limiting resistor 42 to one of the input terminals of a second full-wave diode rectifier 44. The other input terminal of the rectifier 44 is connected to a terminal 45. The anode of the Triac device 28 is connected to a third terminal 41. As indicated in the drawing, the load is connected across terminals 43 and 45 and the AC voltage to be applied to the load is connected across terminals 41 and 45.

The output terminals of the rectifier 44 are connected to the anode and cathode respectively of a second light emitting diode 46. This LED 46 is optically coupled to a photosensitive transistor 48 which in turn is connected in a Darlington configuration with a second transistor 50. The collectors of the two transistors 48 and 50 are connected to a positive voltage source, while the emitters are connected through biasing resistors 54 and 52, respectively, to an electrical ground.

The emitter output of transistor 50 is connected as one of the inputs to logic NAND gate 12.

The rectifier 44, optical coupler 46, 48, and the output transistor 50 form a zero voltage cross-over detection circuit which, through the use of the latching NAND gate 12 prevents the AC voltage from being applied to the load except under a zero voltage condition. This of course prevents large voltage surges from being placed across the load.

In prior art AC switches, the connection of the cross-over detector to the input latching circuit, if such circuitry is provided, would conventionally be by means of transformer coupling. The use of an additional optical isolater in the instant invention avoids still further the potential of high frequency inductive coupling between the load and the digital device.

Figure 2:
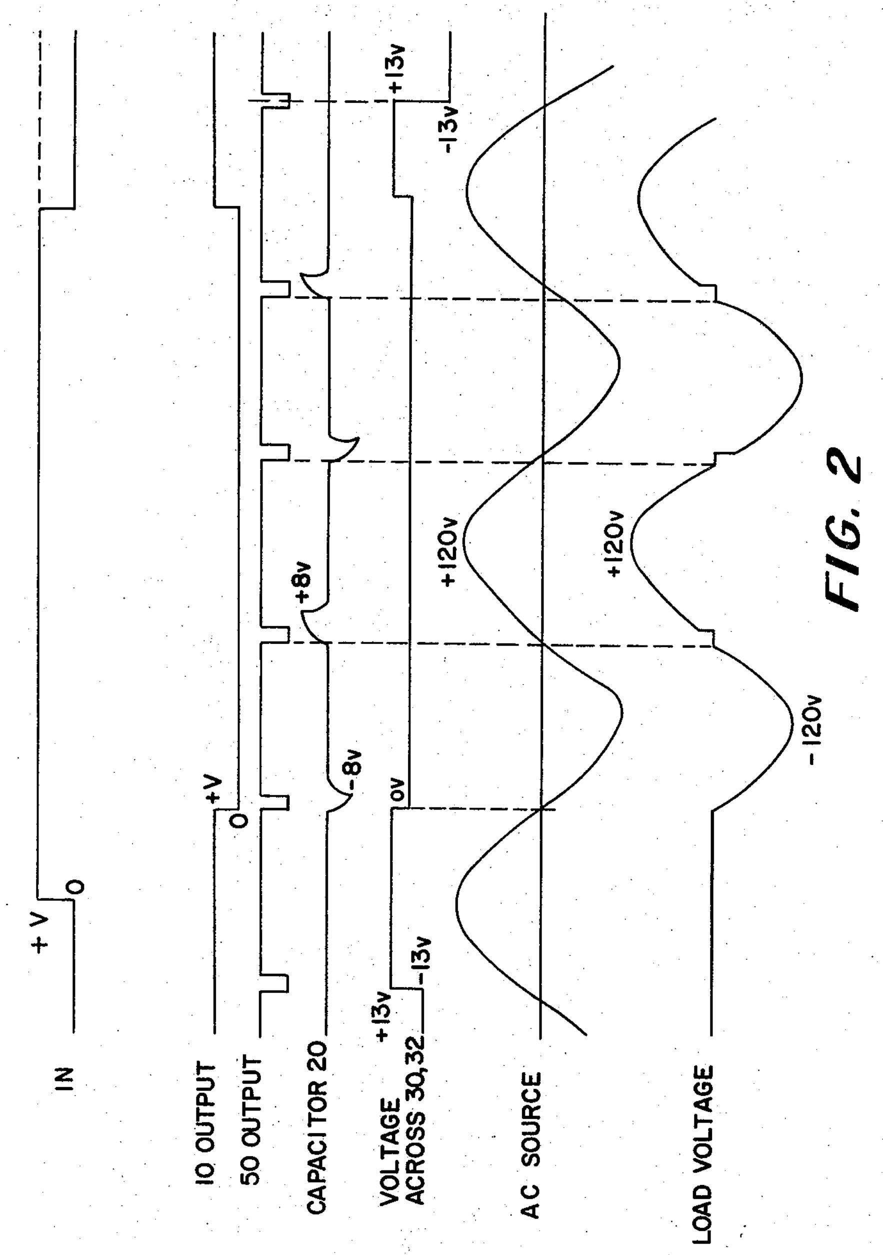
FIG. 2 is a timing diagram useful in describing the operation of the device of FIG. 1.

The operation of the device may be better understood by referring to FIG. 2 in conjunction with FIG. 1.

When an input logic signal is applied to the input NAND gate 10, and the AC voltage being controlled is not at its zero cross-over point, the output of NAND gate 10 remains high as shown in FIG. 2.

As the AC voltage wave-form crosses through the zero voltage point, the diode 46 of the cross-over detector turns off thereby turning off transistor 48. Transistor 48 in turn turns off transistor 50 which drops the line connected between the emitter of transistor 50 and one of the inputs of NAND gate 12, the zero-cross-over latch. As that input to latch 12 comes low, the output goes high and, combined with the high input from the logic source to gate 12 causes the output of gate 10 to go low. As the output of gate 10 goes low, the photo diode 14 is activated as current is drawn from the voltage source +V. The activation of diode 14 turns on transistor 16 to enable a path through the rectifier 18 to charge capacitor 20 to about 8 volts until the bilateral switch 24 conducts. When switch 24 conducts, capacitor 20 discharges through the switch and triggers the Triac 28 through gate 26. Once the Triac has been turned on, it stays in that condition by itself until a zero cross-over of the AC source again occurs. At the zero cross-over point, the cycle is repeated as previously described so long as the logic input on the input of NAND gate 10 remains true, since capacitor 20 will be again recharged, this time in a negative direction, and discharged through bilateral switch 24 to repeat the cycle.

When the input logic to NAND gate 10 goes low the output of the gate goes high thus turning off the photo diode 14. Since capacitor 20 can no longer charge, the next zero cross-over of the AC voltage will turn off the Triac.

The Zener diodes 30 and 32 are used to protect the photo coupler device by clamping the voltage to plus or minus 13 volts. The wave form across the Zener diodes is also shown in FIG. 2.

Obviously, many modifications of the present invention are possible in light of the above teaching. It is therefore to be understood that in the scope of the appended claims, the invention may be practiced other than as specifically described.

What is claimed is:

1. An interface between a digital device and a load to which a load voltage is to be applied, comprising:

a. gating means for receiving a digital control signal from said digital device, said gating means being conditionally responsive to receipt of information from said load voltage,
b. means, including a first optical coupler means, for transmitting said control signal to a switching means, said switching means being operable to apply said load voltage to said load,
c. means, including a second optical coupler means for transmitting said information to said gating means, and
d. whereby receipt of said information by said gating means allows transmission of said control signal.

2. An interface as set forth in claim 1 wherein said voltage is an AC voltage.

3. An interface as set forth in claim 2 wherein said information is representative of the zero-crossing point of said AC voltage.

4. A device as set forth in claim 2 wherein said first and second optical coupler means are solid state means.

5. A device as set forth in claim 4 wherein said first optical coupler means comprises a light emitting diode optically coupled to a light sensitive semiconductor.

7. A device as set forth in claim 5 wherein said second optical coupler means comprises a light emitting diode optically coupled to a light sensitive transistor.

8. A device as set forth in claim 7 wherein said light sensitive semiconductor is a phototransistor.

9. A device as set forth in claim 3 wherein said first and second optical coupler means are solid state means.

10. A device as set forth in claim 7 wherein said first optical coupler means comprises a light emitting diode optically coupled to a light sensitive semiconductor.

11. A device as set forth in claim 10 wherein said light sensitive semiconductor is a phototransistor.

12. A device as set forth in claim 10 wherein said second optical coupler means comprises a light emitting diode optically coupled to a light sensitive semiconductor.

13. A device as set forth in claim 12 wherein said light sensitive semiconductor is a phototransistor.

14. A device as set forth in claim 1 wherein said first and second optical coupler means are solid state means.

15. A device as set forth in claim 14 wherein said first optical coupler means comprises a light emitting diode optically coupled to a light sensitive semiconductor.

16. A device as set forth in claim 15 wherein said light sensitive semiconductor is a photo transistor.

17. A device as set forth in claim 15 wherein said second optical coupler means comprises a light emitting diode optically coupled to a light sensitive semiconductor.

18. A device as set forth in claim 17 wherein said light sensitive semiconductor is a photo transistor.

19. An interface for connecting a digital signal device to a control unit for applying a voltage to a load, comprising:

a. gating means for activating a first optical coupler means in response to a first logic input and a second logic input,
b. means for applying a first logic input to said gating means,
c. means for applying a second logic input to said gating means, and
d. said means for applying said second logic input including a second optical coupler means between said load and said gating means.

20. A device as set forth in claim 19 wherein said first optical coupler means includes a semiconductor light emitter means and a semiconductor light responsive means.

21. A device as set forth in claim 20 wherein said second optical coupler means includes a semiconductor light emitting means and a semiconductor light responsive means.

22. A device as set forth in claim 21 wherein said second optical coupler means is activated when said volt-